Sept. 29, 1953     H. B. MIDDENDORF     2,653,839
CLAMP
Filed June 29, 1951
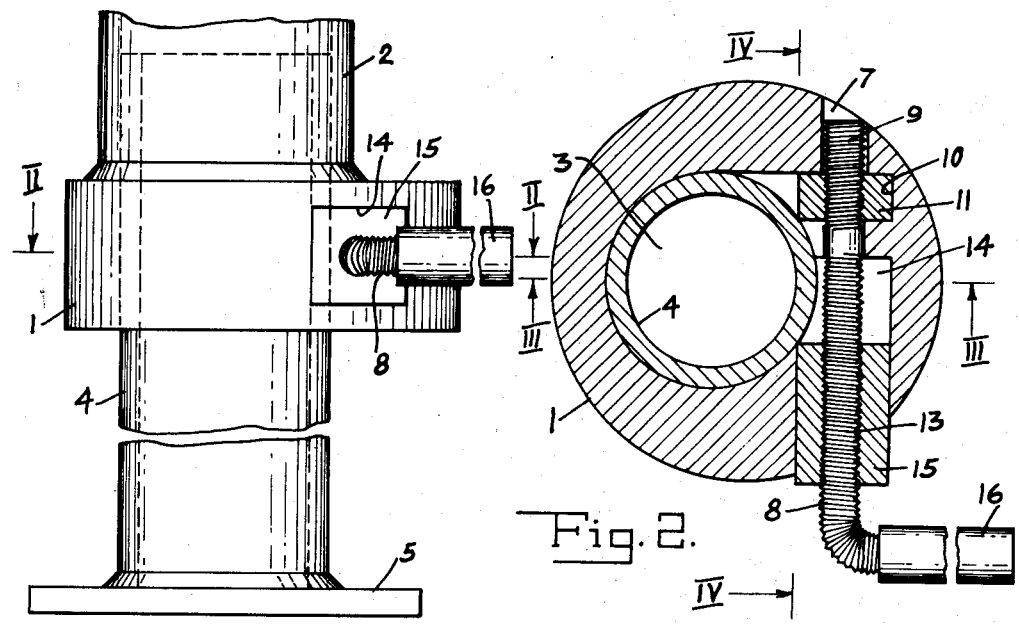
Fig. 1.
Fig. 2.
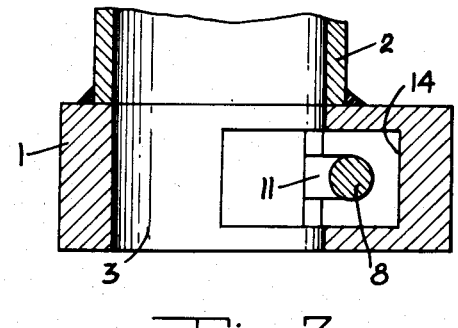
Fig. 3.
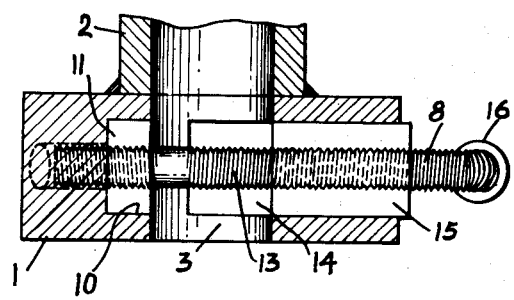
Fig. 4.
INVENTOR.
HENRY B. MIDDENDORF
BY
Brown, Critchlow, Flick & Peckham
his Attorneys Patented Sept. 29, 1953

2,653,839

UNITED STATES PATENT OFFICE 2,653,839

CLAMP

Henry B. Middendorf, Pittsburgh, Pa., assignor to Scaffold Equipment Company, Pittsburgh, Pa., a corporation of Pennsylvania Application June 29, 1951, Serial No. 234,364

3 Claims. (Cl. 287—119)

This invention relates to clamps, and more particularly to those designed for use in tubular metal scaffolds.

It is among the objects of this invention to provide a clamp for holding telescoped members together, in which a clamping screw forces an edge of a clamping nut into engagement with a member being clamped, and in which the screw is mounted in an unthreaded clamp body.

In accordance with this invention, the body of the clamp is provided with an opening extending lengthwise of it for snugly receiving a member that is to be clamped in the body. Preferably, the body is rigidly mounted on one end of a tube, with which the opening through the body is axially aligned so that a tube or rod extending through the clamp body can project into the first tube. The body also is provided with a transverse passage through it at one side of the opening. Rotatably disposed in the passage is a screw which has a projecting end formed for turning it. The screw is provided in the passage with right and left hand threaded portions, on one of which a stationary nut is threaded. The nut is rigidly mounted in the passage. A clamping nut is mounted on the other threaded portion of the screw and is slidable in the passage, but it can not be turned in it. Therefore, when the screw is turned the clamping nut is moved along it. The passage at the inner end of the clamping nut has an open side communicating with the opening in the clamp body, formed by having the opening intersect the passage. When the screw is turned to move the clamping nut inward, an edge of the nut will project into the opening and engage the side of the tube or rod therein to clamp it in place.

The preferred embodiment of the invention is illustrated in the accompanying drawings, in which Fig. 1 is a side view of the clamp mounted on a tubular scaffold leg; Fig. 2 is a horizontal transverse section taken on the line II—II of Fig. 1; Fig. 3 is a vertical longitudinal section of the clamp taken on the line III—III of Fig. 2, but with the inner tube removed from the clamp; and Fig. 4 is a longitudinal section of the clamp taken on the line IV—IV of Fig. 2 with the inner tube removed.

Referring to the drawings, a cylindrical clamp body 1 is welded to the lower end of a tubular leg 2 of a metal scaffold, with the axis of the body offset relative to the axis of the leg. The body of the clamp is provided with a circular opening 3 extending vertically through it in axial alignment with the leg. The diameter of the opening is substantially the same as the inner diameter of the leg. Extending up through the opening and into the lower end of the leg is a short tube 4, on the lower end of which there is a plate 5. This tube and plate serve as a leg extension and foot for the scaffold. To clamp the leg 2 on tube 4 at the desired height, the following means are provided in accordance with this invention.

The body of the clamp is provided with a passage extending transversely (horizontally) through it at the side of opening 3 where the clamp projects the farthest from the tubular members. The cross sectional shape and size of the passage varies in different parts of it as now will be described. One end 7 of the passage is cylindrical and relatively small and receives one end of a clamping screw 8 that extends out through the opposite end of the passage, where its projecting end portion is bent at about a right angle to form a handle for turning the screw. The inner end portion of the screw is provided with screw threads 9, but the passage is not threaded. Instead, the clamp body is provided at the inner end of cylindrical passage 7 with a recess 10 which surrounds the screw and extends through the wall of body opening 3. The recess is formed by enlarging the passage. The recess is rectangular for snugly receiving a nut 11 that is inserted in it from the body opening. The screw is threaded in the nut, and since the nut can not move lengthwise of the passage, the screw will be moved through the nut when the screw is turned. One of the reasons for using such a stationary nut is that the clamp body may be cast from a light metal that will not hold screw threads.

A short distance beyond the inner face of the stationary nut the clamping screw is provided with threads 13 which are of opposite hand to those at the inner end of the screw and which may extend out to the outer end of the screw. Also, starting at about the same point as threads 13, the passage through the clamp is enlarged, as at 14, and is made square in cross section except where openning 3 intersects the central portion of the passage and thus provides it with a concave open side that communicates with the opening. Fitted in the square portion of the passage is a long clamping nut 15 that is mounted on the screw so that it will slide lengthwise of the passage when the screw is turned.

Due to the right and left hand threaded portions of the screw, when the screw is turned in a direction to cause it to move inward through the stationary nut, it will simultaneously move the clamping nut inward on the screw toward the other nut. In view of the fact that the clamp body opening 3 intersects one side of the transverse passage, inward movement of the clamping nut will bring its innermost edge into engagement with the side of the lower tube 4 that extends through the clamp. The screw is turned until the clamping nut is forced tightly against the tube, which will thereby be firmly clamped in place.

When the entire length of the screw is threaded, a sleeve 16 is compressed on the handle to form a smooth surface.

In case the threads engaged by threads 9 at the inner end of the screw become worn or stripped, it is unnecessary to discard the whole clamp. All that needs to be done is to replace stationary nut 11 with a new one.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. A clamp comprising a body provided with an opening extending longitudinally thereof adapted to snugly receive a member to be clamped therein, said body being provided with a transverse passage therethrough at one side of said opening, a screw rotatably disposed in the passage and having a projecting end formed for turning it, the screw being provided in the passage with right and left hand threaded portions, said body being provided with a recess surrounding the screw near one end and extending through the wall of said opening, a stationary nonrotatable nut inserted in said recess and mounted on the threaded portion of the screw extending through the recess, and a clamping nut mounted on the other threaded portion of the screw and slidably but non-rotatably disposed in the passage, said opening intersecting the passage at the inner end of the clamping nut, whereby when the screw is turned to move the clamping nut inward an edge of the nut will project from said open side of the passage and engage said member.

2. A clamp comprising a body provided with an opening extending longitudinally thereof adapted to snugly receive a member to be clamped therein, said body being provided with a transverse passage therethrough at one side of said opening, a screw rotatably disposed in the passage and having a threaded projecting end bent to form a handle for turning the screw, a sleeve rigidly mounted on said handle to make it smooth, the screw being provided in the passage with right and left hand threaded portions, a stationary nonrotatable nut threaded on the threaded portion of the screw farthest from said projecting end and rigidly mounted in said passage, and a clamping nut mounted on the other threaded portion of the screw and slidably but non-rotatably disposed in the passage, the passage at the inner end of the clamping nut having an open side communicating with said opening, whereby when the screw is turned to move the clamping nut inward an edge of the nut will project from said open side of the passage and engage said member.

3. A clamp comprising a body provided with a vertical opening extending therethrough adapted to snugly receive a member to be clamped therein, said body being provided with a horizontal passage therethrough at one side of said opening, a screw rotatably disposed in the passage and having a threaded projecting end bent to form a handle for turning the screw, a sleeve mounted on said handle to make it smooth, the screw being provided in the passage with right and left hand threaded portions, the thread on one of said portions being a continuation of the thread on said projecting end, said body being provided with a recess surrounding the screw near the end opposite to said handle and extending through the wall of said opening, a removable stationary non-rotatable nut fitted in said recess and mounted on the threaded portion of the screw extending through the recess, and a clamping nut mounted on the threaded portion of the screw adjacent the handle and slidably but non-rotatably disposed in the passage, said vertical opening intersecting the horizontal passage at the inner end of the clamping nut, whereby when the screw is turned to move the clamping nut inward an edge of the nut will project from said open side of the passage to engage said member.

HENRY B. MIDDENDORF.

References Cited in the file of this patent

UNITED STATES PATENTS

| Number | Name | Date |
|---|---|---|
| 1,394,596 | Wohl et al. | Oct. 25, 1921 |
| 2,345,269 | Lackey | Mar. 28, 1944 |

FOREIGN PATENTS

| Number | Country | Date |
|---|---|---|
| 14,832 | Great Britain | June 20, 1914 |